(12) United States Patent
Yamagata

(10) Patent No.: US 10,830,680 B2
(45) Date of Patent: Nov. 10, 2020

(54) TENSION APPLYING DEVICE

(71) Applicant: TOYOTA JIDOSHA KABUSHIKI KAISHA, Toyota (JP)

(72) Inventor: Yoshihiro Yamagata, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 170 days.

(21) Appl. No.: 16/222,149

(22) Filed: Dec. 17, 2018

(65) Prior Publication Data

US 2019/0226957 A1 Jul. 25, 2019

(30) Foreign Application Priority Data

Jan. 19, 2018 (JP) .................................. 2018-007366

(51) Int. Cl.
*G01N 3/12* (2006.01)
*G01N 3/06* (2006.01)
*G01N 3/18* (2006.01)

(52) U.S. Cl.
CPC .............. *G01N 3/12* (2013.01); *G01N 3/06* (2013.01); *G01N 3/18* (2013.01); *G01N 2203/0017* (2013.01); *G01N 2203/0226* (2013.01); *G01N 2203/0242* (2013.01)

(58) Field of Classification Search
None
See application file for complete search history.

(56) References Cited

U.S. PATENT DOCUMENTS

| | | | | |
|---|---|---|---|---|
| 4,914,962 A | * | 4/1990 | Clements | G01F 23/0023 73/309 |
| 5,824,885 A | * | 10/1998 | Lekholm | A61M 16/104 73/53.01 |
| 7,890,275 B2 | * | 2/2011 | Takahashi | G01N 11/14 702/50 |
| 9,441,997 B2 | * | 9/2016 | Downie | G01F 23/2966 |
| 2010/0274504 A1 | * | 10/2010 | Takahashi | G01N 11/10 702/50 |
| 2012/0305465 A1 | * | 12/2012 | Eichler | B01D 35/05 210/242.1 |

FOREIGN PATENT DOCUMENTS

JP  H06-300679 A  10/1994
JP  2017-070913 A  4/2017

* cited by examiner

*Primary Examiner* — Natalie Huls
*Assistant Examiner* — Jermaine L Jenkins
(74) *Attorney, Agent, or Firm* — Dickinson Wright PLLC

(57) ABSTRACT

A tension applying device is configured to fix a test substance between a lower fixing part and an upper fixing part, and apply tension between the lower fixing part and the upper fixing part while the test substance is immersed in liquid, wherein the tension applying device includes: a container storing the liquid; a lifter fixed to the lower fixing part and configured to immerse the test substance into the liquid; and a float coupled to the upper fixing part and configured to float in the liquid so as to apply tension to the test substances.

6 Claims, 8 Drawing Sheets

TENSION APPLYING DEVICE

INCORPORATION BY REFERENCE

The disclosure of Japanese Patent Application No. 2018-007366 filed on Jan. 19, 2018 including the specification, drawings and abstract is incorporated herein by reference in its entirety.

BACKGROUND

1. Technical Field

The present disclosure relates to a tension applying device that applies tension to a test substance immersed in liquid.

2. Description of Related Art

Conventionally, an example of a technique in such a field includes a technique described in the following Patent Literature, for example. Japanese Patent Application Publication No. 6-300679 discloses that, in a state in which a test substance is immersed in liquid, one end of the test substance is fixed to a metal support fitting and the other end thereof is coupled to a tension applying device and a displacement measurement controller, and change in length of the test substance due to applied tension is detected through the displacement measurement controller while tension is applied to the test substance via the tension applying device.

SUMMARY

Unfortunately, in the device having the above configuration, since the tension applying device and the displacement measurement controller are required to be provided outside the liquid storing container, there is raised such a problem that causes increase in entire size of the device.

The present disclosure provides a tension applying device capable of promoting reduction in size of the device.

A tension applying device according to a first aspect of the present disclosure includes: a lower fixing part configured to fix a test substance; an upper fixing part configured to fix the test substance between the upper fixing part and the lower fixing part; a container configured to store the liquid; a lifter fixed to the lower fixing part and configured to immerse the test substance into the liquid; and a float coupled to the upper fixing part and configured to float in the liquid in a state in which the test substance is immersed in the liquid so as to apply tension to the test substance between the lower fixing part and the upper fixing part.

The tension applying device according to the present disclosure can apply tension to the test substance using a buoyant force of the float, thus eliminating the tension applying device as described in the related art. Since a degree of the tension applied can be grasped based on the amount of displacement of the lifter, it is possible to eliminate the displacement measurement controller as described in the related art. Accordingly, it is possible to promote reduction in size of the device.

The tension applying device according to the first aspect may be configured to measure a tensile strength of the test substance.

The tension applying device according to the first aspect may further include a fixing base to which a plurality of the lower fixing parts, a plurality of the upper fixing parts, and a plurality of the floats are provided, and the fixing base may be configured to be detachably accommodated in the container and be immersed into the liquid by the lifter. With this configuration, since it becomes possible to apply tension to the plurality of test substances at the same time, it is possible to realize cost reduction and space saving of the device as well as promote efficiency of the test using the tension applying device.

The tension applying device according to the first aspect may include a plurality of the floats.

In the tension applying device according to the first aspect, the test substance may include a membrane electrode gas diffusion layer assembly as a power generating module, and separators holding the membrane electrode gas diffusion layer assembly between the separators.

The tension applying device according to the first aspect may be configured to measure the tensile strength of the test substance by measuring a degree of the tension based on amount of displacement of the lifter.

According to the present disclosure, it is possible to promote reduction in size of the device.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
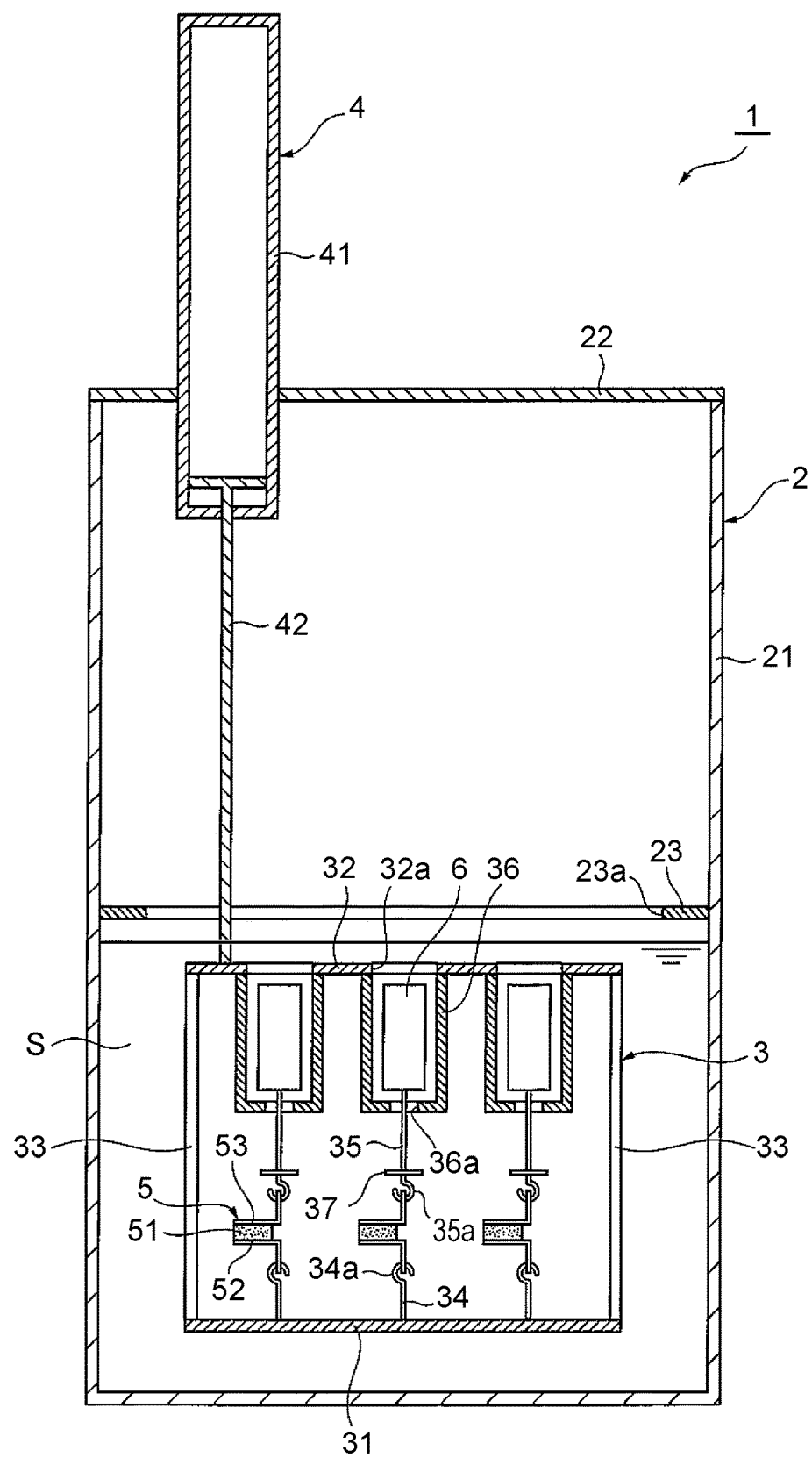
FIG. 1 is a schematic sectional view showing a tension applying device according to an embodiment.

Hereinafter, an embodiment of a tension applying device according to the present disclosure will be described with reference to the drawings. FIG. 1 is a schematic sectional view showing a tension applying device according to the embodiment. The tension applying device 1 of the present embodiment is a device for applying tension to test substances while the test substances are immersed in liquid, and measuring a tensile strength of the test substances. This tension applying device 1 mainly includes a container 2 storing liquid S, a fixing base 3 detachably accommodated inside the container 2, and a lifter 4 to move up and down the fixing base 3 in the height direction.

The container 2 is formed, for example, in a rectangular parallelepiped shape by a metallic material, and includes a bottomed square tubular container body 21 opening upward, and a cover 22 covering the opening of the container body 21. Inside the container body 21, there is provided a partition plate 23 formed in an annular shape so as to have a through-hole 23a at a center thereof and project inward from an inner circumferential wall of the container body 21. The partition plate 23 is made of metal, for example, and is joined to the inner wall of the container body 21 through welding or the like. The through-hole 23*a* has a size large enough to smoothly insert the fixing base 3 therethrough.

The fixing base 3 is formed by a metallic material, for example, and includes: a bottom plate 31 and a top plate 32 each formed in a rectangular shape and facing each other; and four support columns 33 that are arranged at respective four corners of the bottom plate 31 and the top plate 32 so as to couple these plates. No lateral plates and others are provided on the periphery of this fixing base 3 for the sake of facilitating operation of immersing into the liquid S.

A plurality of lower fixing parts 34 for fixing respective lower ends of the test substances (described later) 5 is uprightly provided on the bottom plate 31. Each lower fixing part 34 is formed by a metallic wire or the like, for example, so as to have a hook 34*a*. Each lower fixing part 34 is fixed to the bottom plate 31 through welding or the like such that the hook 34*a* faces upward. On the other hand, the top plate 32 is provided with a plurality of through-holes 32*a* located corresponding to arrangement positions of the lower fixing parts 34. Each through-hole 32*a* has a shape allowing a float 6 described later to pass therethrough.

A plurality of float accommodating parts 36 where the floats 6 are accommodated is provided on a lower surface of the top plate 32. Each float accommodating part 36 has a bottomed cylindrical shape, and is disposed to be suspended at a position immediately under each corresponding through-hole 32*a* in such a manner as to coincide with the position of the corresponding through-hole 32*a*. This float accommodating part 36 is formed by a metallic material, for example, and is fixed to the lower surface of the top plate 32 through welding or the like. A through-hole 36*a* is provided in the bottom of each float accommodating part 36 so as to extend through this bottom. The shape and the size of each through-hole 36*a* is defined to prevent the float 6 from passing therethrough but allow the upper fixing part 35 to pass therethrough, for example.

The fixing base 3 is provided with a plurality of upper fixing parts 35 for fixing respective upper ends of the test substances 5, at positions corresponding to arrangement positions of the respective lower fixing parts 34. Each upper fixing part 35 is formed by a metallic wire or the like to have a hook 35*a*, for example. The hook 35*a* of each upper fixing part 35 is disposed to face downward. The other end of each upper fixing part 35 on the opposite side to the hook 35*a* is inserted through the through-hole 36*a* of each float accommodating part 36 and coupled to each float 6. Above the hook 35*a*, a stopper 37 is provided so as to restrict an excessive upward movement of the upper fixing part 35 coupled to the float 6.

As far as each float 6 is configured to float in the liquid S stored in the container 2, the material, shape, and others of the float 6 are not limited to specific ones, and in the present embodiment, the float 6 is a hollow cylindrical resin body. Each float 6 is accommodated inside each float accommodating part 36, and is coupled to each upper fixing part 35.

In the fixing base 3 as configured above, the float 6 accommodated in each float accommodating part 36, and the upper fixing part 35 and the lower fixing part 34 that are coupled to this float 6 configure a single separate tension applying set. That is, as shown in FIG. 1, it is configured that the lower end of each test substance 5 is fixed to the lower fixing part 34 and the upper end of this test substance 5 is fixed to the upper fixing part 35, and in this state, the test substance 5 can be pulled by utilizing a buoyant force of the float 6 (in other words, tension is applied to the test substance 5).

The lifter 4 is fixedly provided on the cover 22 and coupled to the fixing base 3 such that the fixing base 3 can be immersed into the liquid S. As an example of the lifter 4, a ball screw or the like including a hydraulic cylinder, an air cylinder, an actuator, or a motor can be listed, and in the present embodiment, an air cylinder is used. As shown in FIG. 1, the lifter 4 mainly includes a cylinder tube 41 and a piston 42. The cylinder tube 41 is provided to be inserted through the cover 22 and fixed and supported to the cover 22. On the other hand, the piston 42 is provided to extend inside the container 2, and an extending end thereof is fixed to the top plate 32 of the fixing base 3.

The tension applying device 1 as configured above can be applied to various tests as a device for applying tension to the test substances 5 immersed in the liquid S. Here, with reference to FIG. 2 and FIG. 3, an example in which the tension applying device 1 is applied to a hot-water constant-load immersion and retaining test for inspecting a joint strength between separators of a fuel cell and a MEGA will be described. The load in the hot-water constant-load immersion and retaining test denotes the above-described tension, and in the following description, the tension might be referred to as the load in some cases.

Each test substance 5 according to the fuel cell includes a MEGA (membrane electrode gas diffusion layer assembly) 51 as a power generating module, and a pair of L-shaped separators 52, 53 holding the MEGA 51 therebetween. Each test substance 5 has a substantially T-shape as a whole.

Figure 2:
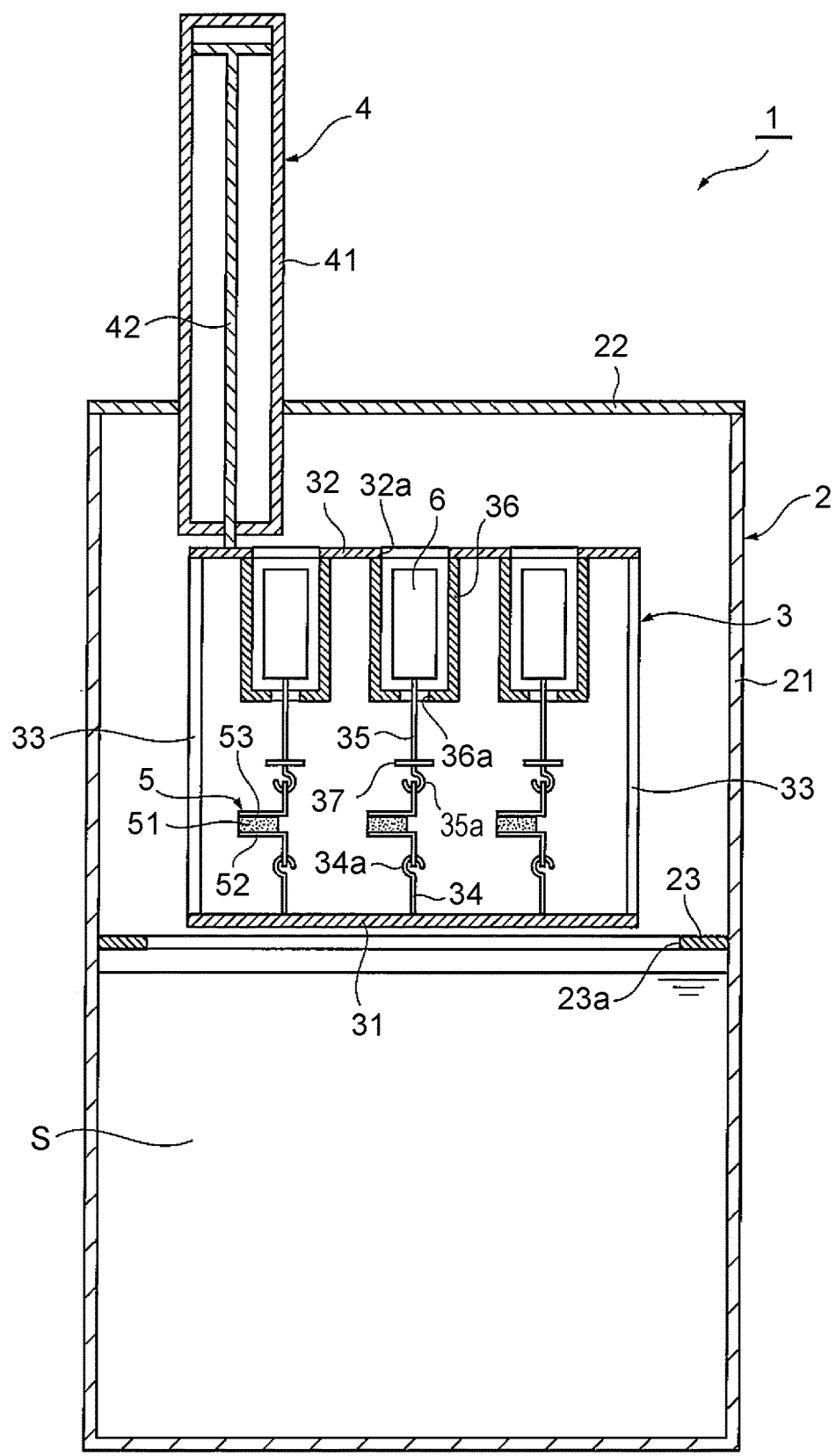
FIG. 2 is a schematic sectional view explaining a hot-water constant-load immersion and retaining test using the tension applying device.

In the hot-water constant-load immersion and retaining test, first, the test substances 5 are disposed in the respective tension applying sets of the fixing base 3, as shown in FIG. 2. Specifically, each float 6 is put in each float accommodating part 36, and is coupled to the upper fixing part 35. Then, for example, tip ends of each separator 52 and each separator 53, not being joined to the MEGAs 51, are respectively formed with holes large enough for allowing the hooks 34*a*, 35*a* to be inserted through the respective holes, the hook 34*a* of the lower fixing part 34 is inserted through the hole of the separator 52, and the hook 35*a* of the upper fixing part 35 is inserted through the hole of the separator 53, respectively, to thereby fix the test substance 5 to the lower fixing part 34 and the upper fixing part 35. The above-described order of steps may be appropriately changed as necessary.

Figure 3:
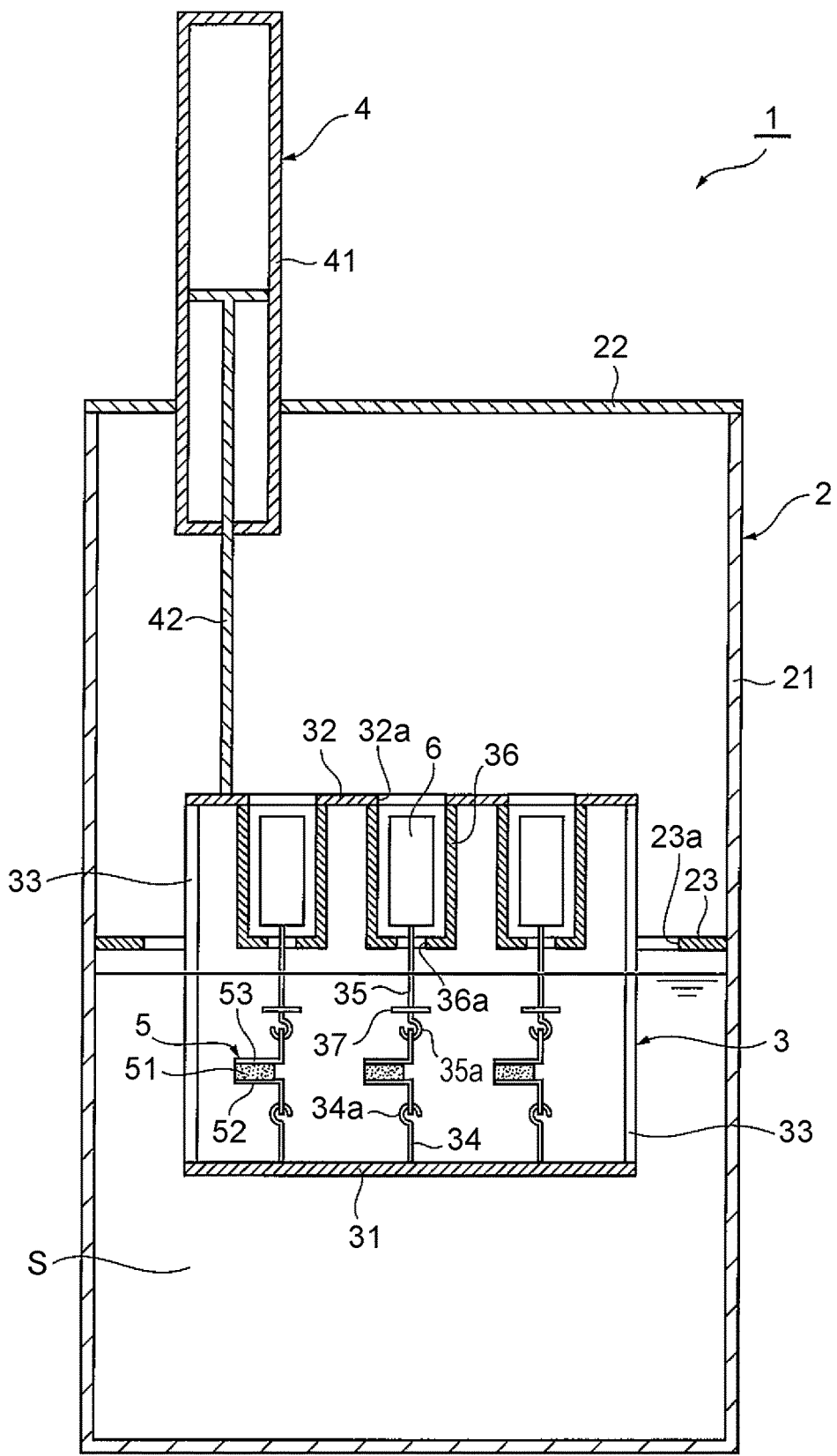
FIG. 3 is a schematic sectional view explaining the hot-water constant-load immersion and retaining test using the tension applying device.

Next, as shown in FIG. 3, by using the lifter 4, the fixing base 3 is moved through the through-hole 23*a* of the partition plate 23 and immersed into the liquid S. As the liquid S, hot water (ion exchanged water in this example) at 90° C. is used, for example. At this time, the hot water flows into the inside of the float accommodating parts 36 from the through-holes 36*a* of the float accommodating parts 36 and from the through-holes 32*a* of the top plate 32. Accordingly, buoyant forces are generated in the floats 6, and thus tension is applied to the test substances 5. When the shape and the volume of each float 6 are constant, a constant load is applied to each test substance 5.

Figure 4:
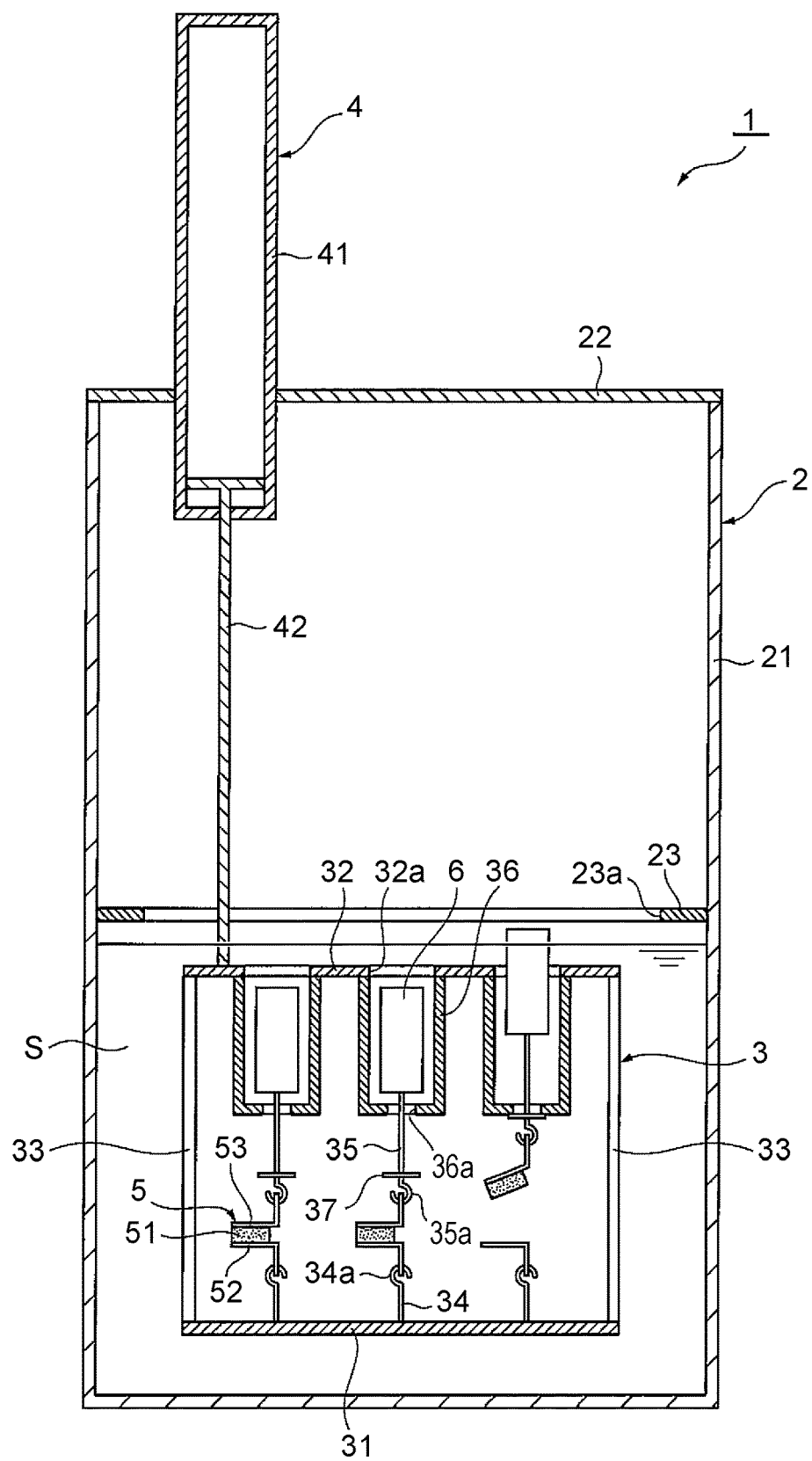
FIG. 4 is a schematic sectional view explaining a defect example of the hot-water constant-load immersion and retaining test.

As shown in FIG. 4, if a defect such as separation occurs between the MEGA 51 and the corresponding separators 52, 53 in any one of the plurality of separate tension applying sets, the float 6 located at the position where this defect occurs floats up in the liquid surface; thus it is possible to easily confirm this defect. Now, for example, by providing a sensor or the like on an inner wall surface of the container body 21 and using this sensor, occurrence of the defect can be detected and a position where the defect occurs can be further determined.

In the tension applying device of the present embodiment, tension can be applied to the test substances 5 using buoyant forces of the floats 6; thus, a conventional tension applying device can be eliminated. Furthermore, since the degree of the tensile force applied can be grasped based on the amount of displacement of the lifter 4, a conventional displacement measurement controller can also be eliminated. As a result, it is possible to promote reduction in size of the device.

In addition, since the fixing base 3 including multiple sets of the lower fixing parts 34, the upper fixing parts 35, and the floats 6 is provided, it is possible to apply tension to the plurality of test substances 5 at the same time using this fixing base 3. Accordingly, it is possible to realize cost reduction and space saving of the device, and also possible to enhance efficiency of the hot-water constant-load immersion and retaining test. Furthermore, the respective tension applying sets of the fixing base 3 are configured to be separated from one another, and thus each set does not receive influences from the other sets. As a result, it is possible to maintain accuracy of the hot-water constant-load immersion and retaining test.

Particularly, in the hot-water constant-load immersion and retaining test, high-temperature hot water is used as the liquid, or a highly dangerous liquid such as a strong acid might be used in some cases; therefore, an operator should be isolated from the test device for safety reasons. To the contrary, in the case of using the tension applying device 1 of the present embodiment, because the operator can conduct the above-described test without approaching the liquid, it is possible to promote safety of the operator.

In the hot-water constant-load immersion and retaining test using the tension applying device 1 of the present embodiment, by changing the volumes and the shapes of the floats 6, various evaluations can be made on the test substances 5.

Figure 5:
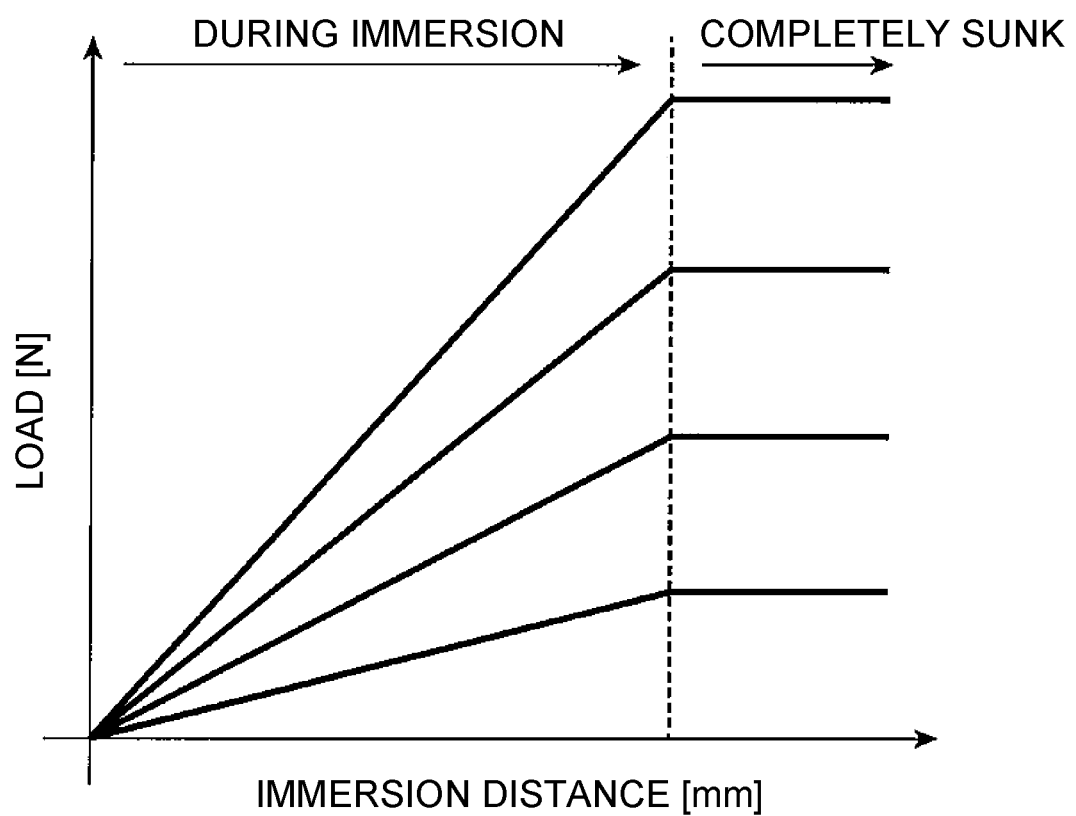
FIG. 5 is a graph explaining a constant load evaluation.
Figure 6:
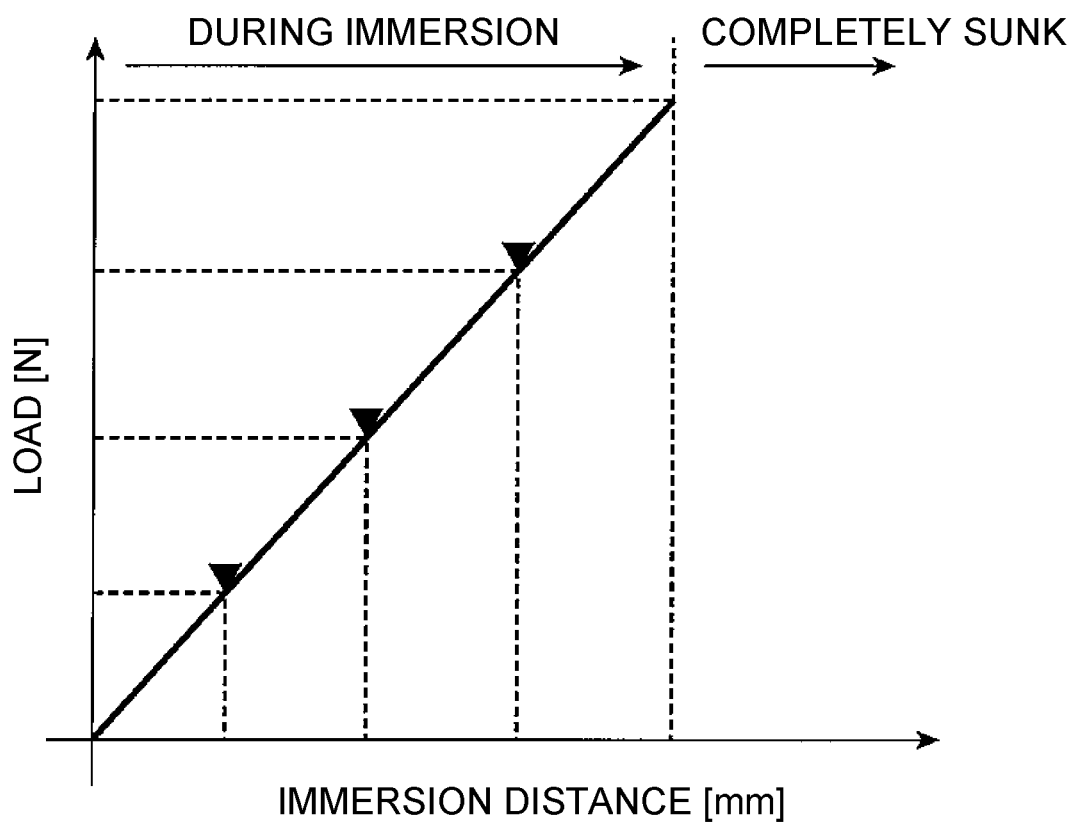
FIG. 6 is a graph explaining a load changing evaluation.
Figure 7:
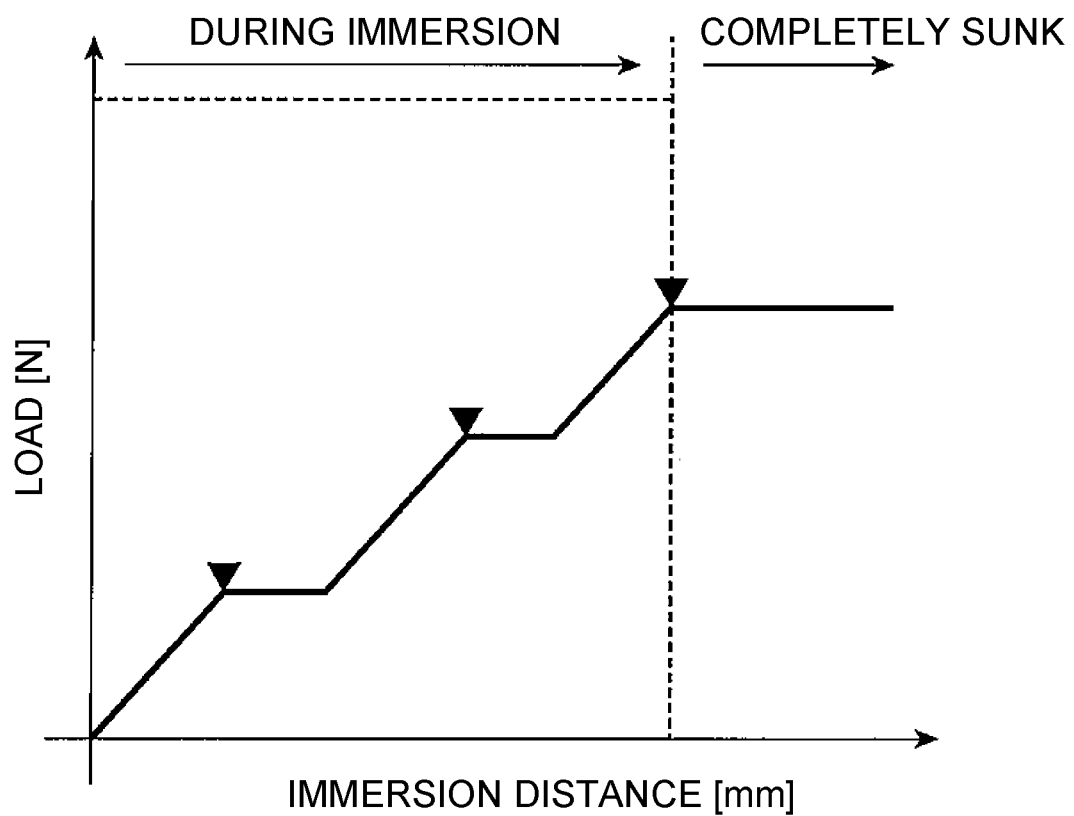
FIG. 7 is a graph explaining a load changing evaluation.

For example, in a constant load evaluation shown in FIG. 5, an immersion and retaining test is conducted with a desired load while a lowering speed of the lifter is set to be constant. In FIG. 5, and FIG. 6 and FIG. 7 described later, a horizontal axis represents an immersion distance, and a vertical axis represents a load. As shown in FIG. 5, during a period from the first contact of each float with the liquid due to the immersion of the fixing base until the float is completely immersed in the liquid (that is, completely submerged), the load applied to each test substance 5 is increased at a predetermined rate in accordance with increase in immersion distance of each float. Since the buoyant force of each float is constant after the fixing base is completely sunk, the load applied to each test substance 5 becomes constant.

In this case, floats all having the same shape and the same volume are not used, but for example, floats having shapes and volumes that are different for each of the test substances 5 are used, that is, floats of different kinds are used. Accordingly, since different buoyant forces are generated in the different types of the floats, it is possible to apply a different load to the same test substance 5.

In addition, in a load changing evaluation shown in FIG. 6, taking account of the correlation between the immersion position of the float and the load, lowering of the fixing base is stopped at every immersion position in accordance with the immersion and retaining test, that is, at every target immersion position, and then the load is changed so as to carry out the evaluation.

Figure 8:
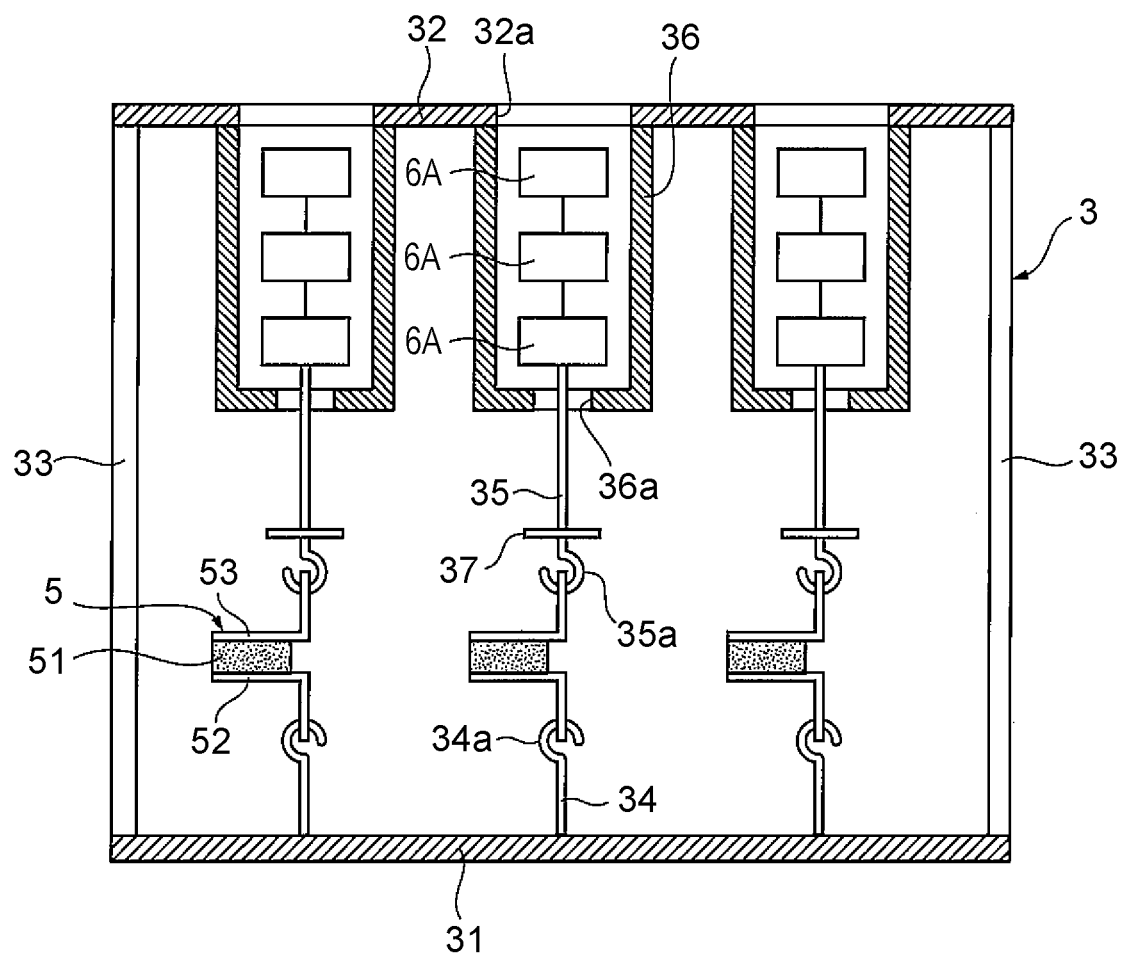
FIG. 8 is a schematic sectional view showing a fixing base having combinations of floats.

Furthermore, in a load changing evaluation shown in FIG. 7, as shown in FIG. 8, a plurality of floats 6A are combined in multiple sets, and every time each of the floats 6A in each set is immersed in turn, a load is further added to each test substance 5. Lowering of the fixing base 3 is then stopped at a target immersion position, and the load is changed so as to carry out the evaluation. In this manner, by using the plurality of floats 6A combined in multiple sets, it is possible to facilitate adjustment for the target load.

Although the embodiment of the present disclosure has been described in detail, the present disclosure is not limited to the aforementioned embodiment, and various design changes can be carried out without departing from the scope and spirit of the present disclosure described in the claims.

What is claimed is:

1. A tension applying device comprising:
   a lower fixing part configured to fix a test substance;
   an upper fixing part configured to fix the test substance between the upper fixing part and the lower fixing part;
   a container configured to store liquid;
   a lifter fixed to the lower fixing part and configured to immerse the test substance into the liquid; and
   a float coupled to the upper fixing part and configured to float in the liquid in a state in which the test substance is immersed in the liquid so as to apply tension to the test substance between the lower fixing part and the upper fixing part.

2. The tension applying device according to claim 1, wherein
   the tension applying device is configured to measure a tensile strength of the test substance.

3. The tension applying device according to claim 2, further comprising
   a fixing base to which a plurality of the lower fixing parts, a plurality of the upper fixing parts, and a plurality of the floats are provided, the fixing base being configured to be detachably accommodated in the container and be immersed into the liquid by the lifter.

4. The tension applying device according to claim 2, wherein
   the tension applying device includes a plurality of the floats.

5. The tension applying device according to claim 2, wherein
   the test substance includes a membrane electrode gas diffusion layer assembly as a power generating module, and separators holding the membrane electrode gas diffusion layer assembly between the separators.

6. The tension applying device according to claim 2, wherein
   the tension applying device is configured to measure the tensile strength of the test substance by measuring a degree of the tension based on amount of displacement of the lifter.

* * * * *